United States Patent
Xu et al.

(10) Patent No.: US 11,162,795 B2
(45) Date of Patent: Nov. 2, 2021

(54) METHOD AND DEVICE FOR DETECTING PEDESTRIAN STRIDE LENGTH AND WALKING PATH

(71) Applicant: BEIJING FINE WAY TECHNOLOGY CO., LTD., Beijing (CN)

(72) Inventors: Feng Xu, Beijing (CN); Ming Lyu, Beijing (CN); Chi Zhang, Beijing (CN)

(73) Assignee: BEIJING FINE WAY TECHNOLOGY CO., LTD., Beijing (CN)

(*) Notice: Subject to any disclaimer, the term of this patent is extended or adjusted under 35 U.S.C. 154(b) by 701 days.

(21) Appl. No.: 15/984,330

(22) Filed: May 19, 2018

(65) Prior Publication Data

US 2018/0372500 A1   Dec. 27, 2018

(30) Foreign Application Priority Data

Jun. 23, 2017   (CN) .......................... 201710487319.5

(51) Int. Cl.
   *G01C 21/20*   (2006.01)
   *G01C 21/16*   (2006.01)
   *G01C 22/00*   (2006.01)

(52) U.S. Cl.
   CPC ........... *G01C 21/206* (2013.01); *G01C 21/16* (2013.01); *G01C 21/20* (2013.01); *G01C 22/00* (2013.01); *G01C 22/006* (2013.01)

(58) Field of Classification Search
   CPC ...... G01C 21/16; G01C 21/20; G01C 21/206; G01C 22/00; G01C 22/006
   See application file for complete search history.

(56) References Cited

U.S. PATENT DOCUMENTS

| | | | | |
|---|---|---|---|---|
| 4,250,403 A | * | 2/1981 | Nomura | .................. G01C 21/26 377/24 |
| 8,460,001 B1 | * | 6/2013 | Chuang | .............. G09B 19/0038 434/247 |

(Continued)

FOREIGN PATENT DOCUMENTS

| CN | 101907467 A | 12/2010 |
|---|---|---|
| CN | 102323854 A | 1/2012 |

(Continued)

OTHER PUBLICATIONS

Chiu, "Design and Implementation of Pedestrian Inertial Navigation System on iPhone," Chinese Master Theses Full-text Database—Information Technology, Jul. 15, 2014, pp. 15-16 & 25-31 (I136-615), vol. 1, China National Knowledge Infrastructure, Beijing China.

(Continued)

*Primary Examiner* — Kyle R Quigley

(57) ABSTRACT

A method and an electronic device for detecting pedestrian stride length and walking path. A peak value of longitudinal acceleration data is detected. The longitudinal acceleration data between two adjacent peaks are integrated twice. A longitudinal displacement amplitude value is obtained based on the integration result. The stride length data is obtained based on the longitudinal displacement amplitude value, user's foot length and user's leg length. The method and the electronic device for detecting pedestrian stride length and walking path provided improves the positioning accuracy of the pedestrian and reduce the implementation cost.

20 Claims, 4 Drawing Sheets

(56) References Cited

U.S. PATENT DOCUMENTS

| | | | |
|---|---|---|---|
| 2013/0338961 A1* | 12/2013 | Youssef | G01C 21/005 702/141 |
| 2014/0019082 A1 | 1/2014 | Lan et al. | |
| 2014/0156216 A1* | 6/2014 | Ten Kate | G08B 21/0446 702/142 |
| 2014/0172361 A1* | 6/2014 | Chiang | G01C 22/006 702/160 |
| 2014/0364979 A1 | 12/2014 | Yoshizawa et al. | |
| 2016/0213975 A1* | 7/2016 | Flaction | G01C 22/006 |

FOREIGN PATENT DOCUMENTS

| | | |
|---|---|---|
| CN | 103616030 A | 11/2013 |
| CN | 104180805 A | 12/2014 |
| CN | 204158397 U | 2/2015 |
| CN | 105122006 A | 12/2015 |
| CN | 106168485 A | 11/2016 |
| CN | 106652548 A | 5/2017 |
| JP | 2011-149923 A | 8/2011 |
| WO | 2018220911 A1 | 12/2018 |

OTHER PUBLICATIONS

Li, "Research and Design of Vehicle Attitude Measuring System Based on Multi-dimensional Acceleration Sensor," Chinese Master Theses Full-text Database—Engineering and Science Technology II, Feb. 15, 2016, pp. 21-28 (C034-178), vol. 2, China National Knowledge Infrastructure, Beijing China.

Tian et al., "Pedestrian Navigation Algorithm Based on the Smart Phone MARG Sensors," pp. 223-227, vol. 26 No. 2, Journal of Chongqing University of Posts and Telecommunications (Natural Science Edition), Chongqing University of Posts and Telecommunications, Chongqing China.

* cited by examiner

METHOD AND DEVICE FOR DETECTING PEDESTRIAN STRIDE LENGTH AND WALKING PATH

RELATED APPLICATION

The present application claims the benefit of CN201710487319.5 filed Jun. 23, 2017, which is incorporated herein by reference in its entirety.

FIELD OF THE INVENTION

The present invention relates to the technical field of indoor positioning, in particular, to a method for detecting pedestrian stride length and walking path.

BACKGROUND OF THE INVENTION

The solutions used in the prior art to implement indoor positioning/navigation include methods such as those based on geomagnetism, wireless signal (Bluetooth, WIFI, mobile communication signal, etc.) fingerprint, inertial guidance, and the like. These technologies usually suffer disadvantages such as low accuracy or expensive equipment, so they are difficult to apply widely. Furthermore, in addition to the need for smart phones, some positioning technologies also rely on other detection devices to achieve positioning, and their versatility is not strong.

The personal dead reckoning (PDR) is a method of estimating the position of the next moment by measuring the distance and direction of movement by means of accelerometers, magnetic compasses, gyroscopes, etc., under the condition that the position of initial time is known. The PDR technology can solve the defects in the existing indoor positioning/navigation technology. However, the output signals of the accelerometer and the angular velocity meter have large errors, and in particular, there will be a large zero drift error with time; because there is no reasonable mathematical model and no effective error correction for the PDR, which make it easy for the walking path calculated based on PDR technology to accumulate errors, leading to decreased accuracy of positioning.

OBJECTS AND SUMMARY OF THE INVENTION

In the first aspect, a method for detecting pedestrian stride length is provided, comprising steps of:

detecting with a processor peak values of longitudinal acceleration data from the accelerometer, the time period between two adjacent peaks being a stride interval;

integrating with the processor the longitudinal acceleration data within the stride interval to obtain a velocity data;

integrating with the processor the velocity data to obtain longitudinal displacement amplitude data;

taking the maximum and minimum values of the longitudinal displacement amplitude data, and subtracting the minimum value from the maximum value to obtain the longitudinal displacement amplitude value; and calculating with the processor the stride length data based on the geometric relationship between the longitudinal displacement amplitude and a human walking model.

Preferably, after obtaining the velocity data, the processor integrating the velocity data to obtain longitudinal displacement amplitude data further includes:

calculating with the processor a median velocity based on the velocity data; and integrating with the processor a value left after subtracting the median velocity from the velocity data to obtain longitudinal displacement amplitude data.

Preferably, the geometrical relationship of the human walking model includes a calculation relationship of calculating the stride length based on a longitudinal displacement amplitude value, a human leg length and a foot length, and the human body leg length and the foot length come from a user's input or a default experience value.

Preferably, when the processor detecting peak values of longitudinal acceleration data from the accelerometer, when a peak signal appears and no new peak signal appears after the time of half a stride interval delays, the processor determines that the peak signal is a true peak signal, and the time of half a stride interval comes from historical statistics or default experience values.

Preferably, the obtaining the longitudinal displacement amplitude value further includes the processor using a range factor to adjust the longitudinal displacement amplitude value, wherein the range factor is a default experience value or is obtained by comparing the longitudinal displacement amplitude value estimated by the human walking model with a measured value.

Preferably, during the walking between two known points, the processor compares a distance between two points obtained by adding the detected stride lengths with the actual known distance between the two points, then performs reverse reasoning to obtain and update the range factor.

In the second aspect, a method for detecting pedestrian walking path is provided, comprising steps of:

acquiring with the processor the position and direction of the starting point of the walking path;

detecting with the processor peak values of longitudinal acceleration data from an accelerometer, the time period between two adjacent peaks being a stride interval, and calculating the stride length data of a stride interval based on the longitudinal acceleration data;

integrating with the processor an angular velocity signal from an angular velocity meter in the stride interval, the initial deflection angle during integration being set to zero, to obtain the deflection angle generated in the stride interval; and starting with the processor from the starting point of the path, and calculating the walking path of the pedestrian based on the deflection angle and the stride length data of a stride interval.

Preferably, starting with the processor from the starting point of the path, and calculating the walking path based on the deflection angle and the stride length data of a stride interval includes:

starting with the processor from the starting point of the path, using the direction of the starting point plus the deflection angle of current stride as a path direction of current stride, to draw a walking path along the path direction of current stride based on the stride length data of current stride.

Preferably, starting with the processor from the starting point of the path, and calculating the walking path based on the deflection angle and the stride length data of a stride interval includes:

starting with the processor from the starting point of the path and judging whether each stride is a straight line or a turn based on the deflection angle of the stride interval;

drawing the walking path along the direction of the starting point based on the stride length data of current stride if the current stride is a straight line; and using the direction of the starting point plus the deflection angle of current stride as a path direction of current stride to draw a walking path along the path direction of current stride based on the stride length data of current stride if the current stride is a turn.

Preferably, accumulating the deflection angles of N strides to obtain the direction angle cumulative offset value if the processor determines that N consecutive strides are all straight;

dividing the direction angle cumulative offset value by the time of this N strides to obtain the angular velocity zero drift value; and prior to the processor integrating an angular velocity signal from a angular velocity meter in the stride intervals, integrating after subtracting the angular velocity zero drift value from the angular velocity signal, and then integrating.

Preferably, during drawing the walking path, the processor acquiring a map data of the user's location; and matching the turning point in the map data based on the path if the processor detects that the user makes a turn and correcting the walking path based on the matched turning point.

Preferably, obtaining with the processor a map data of the location of the user, comparing the walking path with the route in the map data, and calculating a yaw angle if the walking path deviates from the route in the map data and correcting the walking path back to the correct direction and length based on the yaw angle.

Preferably, acquiring with the processor the position and direction of the starting point of the walking path includes:

acquiring with the processor the location and direction of the starting point through a position and an orientation sensor; or determining with the processor the location and direction of the starting point based on historically calculated data.

Preferably, after calculating with the processor the pedestrian walking path, further comprising:

drawing with the processor the pedestrian walking path and outputting it to a display device for displaying.

Preferably, calculating with the processor the stride length data of a stride interval based on the longitudinal acceleration data specifically includes:

integrating with the processor the longitudinal acceleration data within the stride interval to obtain a velocity data;

integrating with the processor the velocity data to obtain longitudinal displacement amplitude data;

taking the maximum and minimum values of the longitudinal displacement amplitude data, and subtracting the minimum value from the maximum value to obtain the longitudinal displacement amplitude value; and calculating with the processor the stride length data based on the geometric relationship between the longitudinal displacement amplitude and a human walking model.

The third aspect provides an electronic device comprising a processor and a memory that stores an instruction executable by a processor, when the processor runs the instruction, the electronic device executes the method of any one of above solutions.

The method and the electronic device for detecting pedestrian stride length and walking path provided by the present invention improve the positioning accuracy of the pedestrian and reduce the implementation cost.

DETAILED DESCRIPTION OF THE EMBODIMENTS

The embodiments of technical solution of the present invention will be described in detail in connection with the attached drawings. The following embodiments only serve as examples to illustrate the technical solution of the invention and not be given to limit the scope of protection of the invention.

It shall be noted that unless otherwise mentioned, all technical and scientific terms used herein have the same meaning as commonly understood by a person skilled in the art to which the invention belong.

Embodiment 1

Figure 1:
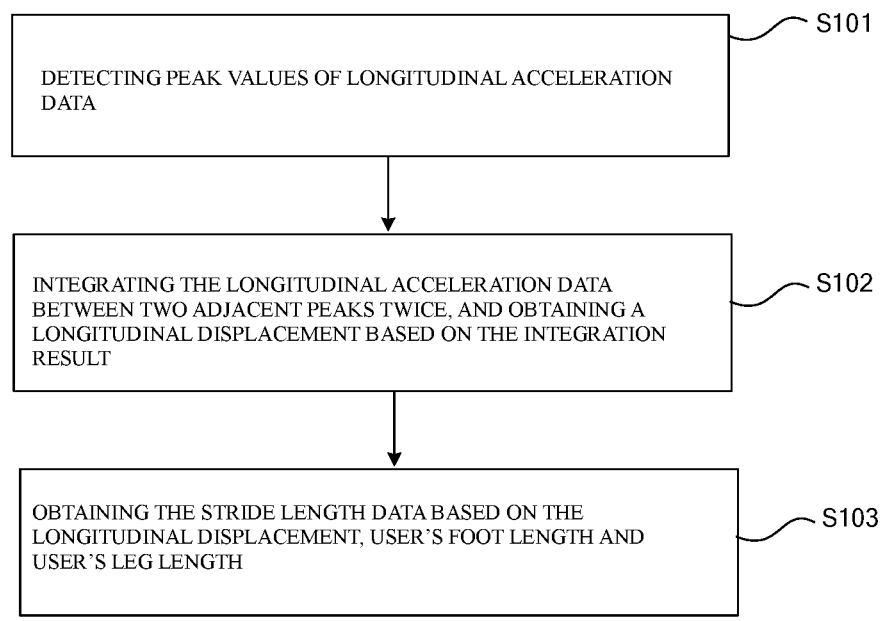
FIG. 1 is a flow chart of the method for detecting the pedestrian stride length according to Embodiment One of the present invention.

As shown in FIG. 1, the present embodiment provides a method for detecting the pedestrian stride length, comprising:

Step S101: Detecting a peak value of longitudinal acceleration data.

Among them, the longitudinal acceleration data comes from the acceleration sensor, and the longitudinal acceleration data describes the change of acceleration of the user in the direction of gravity in the walking process over time.

Step S102: Integrating the longitudinal acceleration data between two adjacent peaks twice; and obtaining a longitudinal displacement amplitude value based on the integration result.

Among them, the time period between two adjacent peaks of the longitudinal acceleration is defined as a stride interval; the previous peak corresponds to the start point of one stride, and the next peak corresponds to the end point of the stride. The longitudinal displacement amplitude value is the displacement of the user's center of mass in the direction of gravity during a one-stride process.

Step S103: Obtaining the stride length data based on the longitudinal displacement amplitude value, user's foot length and user's leg length.

Among them, the stride length data is the distance that the user crosses in one stride.

The data of longitudinal displacement amplitude can be obtained by integrating the acceleration data twice, but the starting point and end point of the integration need special detection and determination. In the prior art, zero velocity detection is usually used to integrate between two zero velocity positions. In reality, the starting point and end point of the integration determined by this detection method are not accurate, and the method will bring a lot of error to the final detection result for the stride length.

The velocity curve is a periodic function, so let it be approximated as a Sin function in the model. And the acceleration function can be approximated as a Cos function. Thus, this can be assumed to be the zero crossing point of the velocity curve when the acceleration curve is at the peak. Therefore, in this embodiment, it is not necessary to detect the zero velocity position, but instead, directly the velocity is set to be zero at the position of the acceleration peak and the interval between two adjacent peaks of the longitudinal acceleration is set to be a stride interval. The stride interval determined by above method is more accurate. Thus, the operation of obtaining the longitude displacement amplitude value by integrating the acceleration data in the stride interval twice is more in line with the actual situation of the user's movement, and can make the finally-determined stride length data more accurate.

Compared with the existing zero velocity detection method, the detection method for stride length provided by this embodiment can determine the stride interval more accurately, thereby improving the detection accuracy of the stride length data and providing more accurate basic data for indoor navigation and positioning. In addition, the method of the present embodiment is simple and highly-efficient, does not require expensive hardware devices, does not require the establishment of a new infrastructure (such as Bluetooth, WIFI, etc.), and all the mobile terminals that carry acceleration sensors and have been equipped with sufficient storage space and have a processor with certain computing capabilities can also be used to implement the method of this embodiment.

Figure 2:
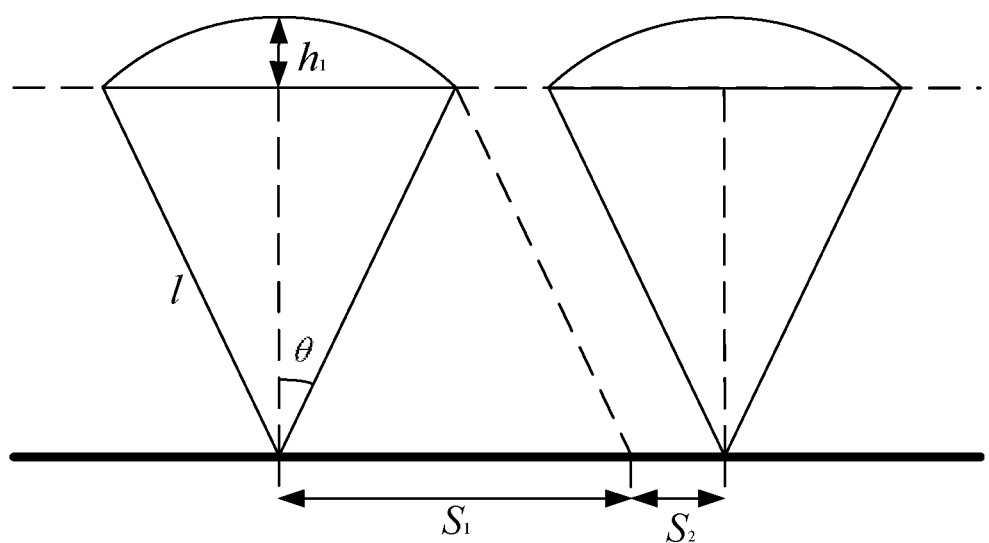
FIG. 2 is a diagram of human walking model.

FIG. 2 illustrates a diagram of human walking model, showing a view of the geometrical relationship between the physical quantities during the human body's walking, wherein $h_1$ is the longitudinal displacement amplitude, l is the user's leg length, $S_2$ is the user's foot length. So $S_1 = 2\sqrt{2lh_1 - h_1^2}$ can be obtained through geometric relations and an entire stride length data Len=$S_1+S_2$ can further be obtained.

Through step S101, the peak value of the longitudinal acceleration data is detected, and the interval between two adjacent peaks is a stride interval. For convenience of description, the time point corresponding to the previous peak is denoted by $t_1$, and the corresponding time point corresponding to the successive peak is recorded as $t_2$.

In this embodiment, the interval between two adjacent peaks of the longitudinal acceleration is set as a stride interval, and the longitudinal displacement amplitude value is obtained by integrating the acceleration data in the stride interval twice, wherein $S_1$ value of each stride is calculated independently. At the beginning of each stride, the longitudinal displacement amplitude value of the body mass center at the corresponding peak should be zero. After each stride interval is completed, the longitudinal displacement amplitude value of the body mass center should return to zero. So, this assumption can be used to eliminate the error. And the maximum value of the longitudinal displacement amplitude value in this integration interval is $h_1$, and then the $S_1$ value is further calculated.

Based on above method embodiment, the specific embodiment of step S102 includes:

Step S201: Integrating the longitudinal acceleration data between two adjacent peaks to obtain a velocity data. Assuming the longitudinal acceleration data is a, the velocity data as v=∫a·dt, the starting point of the integration as $t_1$, and the ending point as $t_2$.

Step S202: Integrating the velocity data to obtain longitudinal displacement data h=∫vdt. The longitudinal displacement data h is a function of time.

Step S203: Taking a maximum value and a minimum value of the longitudinal displacement data h during the integration from $t_1$ to $t_2$ and subtracting the minimum value from the maximum value to obtain the longitudinal displacement $h_1$. Among them, the minimum value may be a negative value.

Another preferred implementation method of step S102 includes:

Step S211: Integrating the longitudinal acceleration data between two adjacent peaks to obtain a velocity data. Assuming the longitudinal acceleration data is a, the velocity data as v=∫a·dt, the starting point of the integration as $t_1$, and the ending point as $t_2$.

Step S212: Calculating a median velocity $$v_{median} = \frac{\sum v \Delta t}{\sum \Delta t}$$

based on the velocity data.

Step S213: Integrating a value left after subtracting the median velocity from the velocity data to obtain longitudinal displacement data h=∫(v−$v_{median}$)dt. Because there is zero drift in the accelerometer, which causes a non-zero drift in the median velocity, this algorithm limits the accumulation of zero drift. The zero velocity assumption based on the motion model is equivalent to zeroing the median velocity forcefully. By subtracting the median velocity from the velocity data, it is ensured that the entire longitudinal displacement amplitude value in a stride interval is zero.

Step S214: Taking a maximum value and a minimum value of the longitudinal displacement amplitude data during the integration from $t_1$ to $t_2$ and subtracting the minimum value from the maximum value to obtain the longitudinal displacement amplitude value. Among them, the minimum value may be a negative value.

There are multiple preferred embodiments of step S101. Based on any of the above embodiments, in order to ensure the authenticity of the detected peaks, for the peak detection of the longitudinal acceleration data, a half-cycle delay may be performed (one cycle being equal to one stride interval, the person walking one stride for about 0.5 seconds, and when the peak value maintains half a period of 0.25 seconds, it is determined that the former is the true peak. This will not cause misdetection and missed detection. The time for confirming peaks lags for half cycle. Though confirming the peak point after the waveform composed of longitudinal acceleration data includes the actual peak point will bring a half-stride delay, this delay is within the acceptable range, and the above processing method can ensure that the detected peak is true and accurate.

In any of the above embodiments, data such as the user's leg length, user's foot length, and the like are constants for a certain user. Although the values are not easily obtained, they can be derived from data entered by the user or parameters called from other software.

For example, one-half of the height can be used to determine the user's leg length, and the height value can be obtained from user input or parameters called from other software. Even if no specific data is available, typical height values such as 1.75 meters can be used, which can basically cover the crowd of 1.6-1.9 meters. The error is within the tolerable range. Since the user's leg length value is in the root upon calculating the stride length data, the effect on the value of $S_1$ is not so great and is even not greater than the signal noise.

The length of the user's foot can also be determined by the user's input, but this will bring inconvenience to the user experience, and hence the gain obtained is not obvious. With respect to the length of each stride, the difference in foot length is only a few centimeters at most. Therefore, inputting the foot length by the user is not a necessary operation, so it can be assumed as a typical value, for example, 26 cm. In addition, the user's foot length can also be calculated through the human body's physiological model. For example, the length of the user's foot is set to be 0.147 times the height of the user. According to existing research data, the ratio of height to foot length of an average Chinese is 6.8:1, the ratio of an average European is 7:1. These parameters can be used to estimate the user's foot length.

Due to the user's walking gait and the differences in the sensor system of the mobile terminal, the obtained stride length data may have errors. On the basis of any of above embodiments, this embodiment reduces above errors by adding a range factor in the calculation process. Specifically, $S_1 = 2\sqrt{2lH-H^2}$, where $H = k \cdot h_1$, k is the range factor. The amplitude value of the longitudinal displacement in each stride interval is adjusted by introducing the range factor, so that the result is more accurate.

In order to further improve the measurement accuracy, in this embodiment, in the initial process of the user detecting the stride length through a mobile terminal, the range factor k may be adaptively adjusted during the calculation of the stride length and the range factor k is finally determined by synthesizing initial adjustment results. The range factor k comprehensively considers the user's walking characteristics and system errors, so the user's walking characteristics and the sensor system error of the mobile terminal can be adjusted to reduce the calculation error of the stride length data.

The preferred method of adaptively adjusting the range factor k includes the following two methods:

(1) When it is possible to obtain the actual position during the user's walk, the range factor k is adaptively adjusted by knowing the determined distance. For example, if the user's actual location A and B can be obtained during the user's walk, a real distance between A and B can be obtained; at the same time, the method for detecting stride length can be used to obtain the sum of all stride length data in the user's walk from A to B; then according to the real distance and estimated distance between A and B, the range factor is reversed. For example, the actual location during the user's walk can be obtained through existing indoor positioning technologies such as geomagnetism or wireless signal fingerprints.

(2) When it is impossible to obtain the actual location during the user's walk, the empirical formula can be used to inverse the range factor k. For example, based on human physiological model assumptions, people's stride angle is about 14-18 degrees. Then taking the appropriate stride angle and estimating the stride length according to the leg length, foot length and stride angle, then inversely calculating the error of the longitudinal displacement amplitude value of the human body mass center based on the estimated stride length, thus the range factor is obtained. The typical stride angle can be 15.5 degrees or 17 degrees. For example, the stride angle may be preferably 16.5 degrees. The engineering optimization algorithm can be used, the high order of $h_1$ square can be omitted, then the formula is revised as $$k = \frac{(\sin\theta)^2 l}{2\overline{h_1}},$$

wherein $\overline{h_1}$ is the actually-measured average value of the longitudinal displacement amplitude value and θ is the stride angle.

Of course, it is also possible to adaptively adjust the range factor by means of machine learning statistics in actual applications.

The frequency of human's walking is about 2 Hz, which is usually two strides per second. The stride length and the direction angle are updated with each stride change. In the present embodiment, the sampling frequency of the sensor output data is 50 Hz to ensure that the amount of data collected in each stride interval can meet the requirements for processing accuracy.

Due to the noise inevitably existing in the sensor output data, the acceleration data output by the acceleration sensor may also be subjected to noise reduction processing before step S101.

Certainly, the white noise of the sensor output data in one section has positive and negative directions. Since the embodiment uses the integration method to process the acceleration data, the white noise contained in the data can be removed to some extent, that is equivalent to performing Kalman filter. As a result, the noise reduction process before step S101 can be omitted.

Each of the preferred embodiments in the present embodiment can be arbitrarily combined.

The method of detecting the pedestrian walking path in the present embodiment is simple and highly-efficient, does not require expensive hardware devices, does not require the establishment of a new infrastructure (such as Bluetooth, WIFI, etc.), and all the mobile terminal that carry accelerometers, angular velocity meters and have been equipped with sufficient storage space and have a processor with certain computing capabilities can also be used to implement the method of this embodiment. For example, a user can carry a mobile smart terminal, such as a smart wristband, a smart phone, etc., when walking. An accelerometer and an angular velocity meter are installed in the mobile smart terminal. The accelerometer will generate acceleration data according to the user's motion sensing and the angular velocity meter will generate an angular speed signal according to the user's motion sensing. The embodiments of the present invention need to use the acceleration data of the gravity direction (i.e. the longitudinal direction) and the angular velocity signal of the horizontal direction for calculation. Since the acceleration data directly output by the accelerometer is generated based on the carrier coordinate system of the accelerometer itself, it is also necessary to convert the acceleration data obtained from the accelerometer in the carrier coordinate system to the longitudinal acceleration data in the geodetic coordinate system. Similarly, the conversion method for coordinate system is used to obtain the angular velocity signal in the horizontal direction. The conversion method for coordinate system can adopt any conversion methods for coordinate system in the prior art, which is not specifically limited in the present invention, and all of them are within the protection scope of the present invention.

Any methods provided in the present embodiment not only can be used for pedestrian and indoor navigation, but also can replace the hardware pedometer to obtain the stride counter while calculating the walking distance. The method can also be used for instant positioning, map construction, and available for commercial occasions such as signal fingerprint database collection.

The method provided in the present embodiment can also be combined with other positioning and navigation technologies for outdoor positioning and outdoor navigation. For example, in combination with GNSS technology and based on the advantages of high short-range positioning accuracy in the present embodiment, the short-distance positioning and navigation accuracy is improved while avoiding the long-term drift error, and the positioning and navigation accuracy of the GNSS in the outdoor is improved while reducing the power consumption (low-frequency acquisition of GNSS etc.). The method provided in the present embodiment provides a high-precision, low-power general solution for indoor and outdoor positioning navigation.

Embodiment 2

Figure 3:
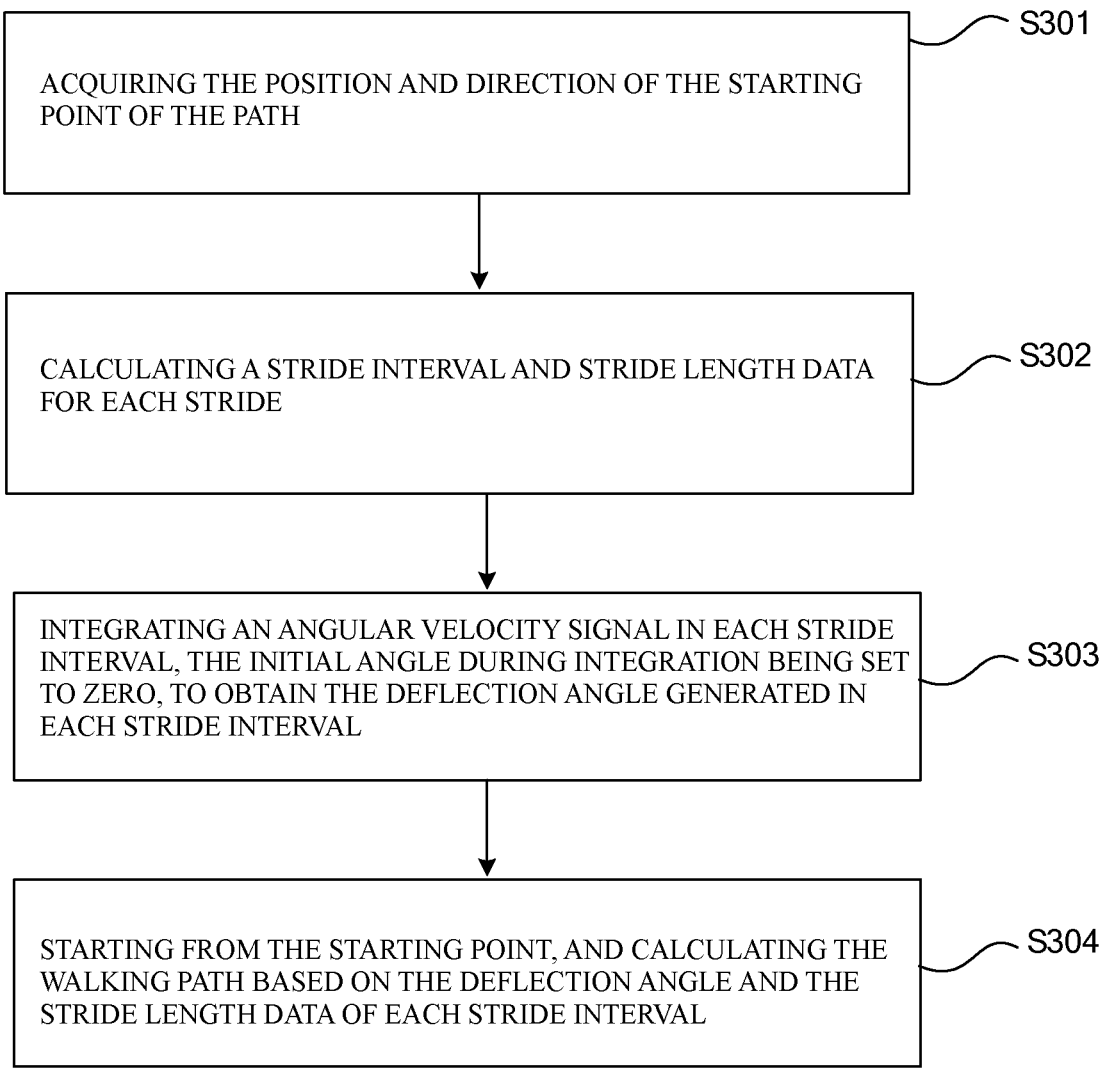
FIG. 3 is a flow chart of the method for detecting the pedestrian walking path according to Embodiment Two of the present invention.
Figure 4:
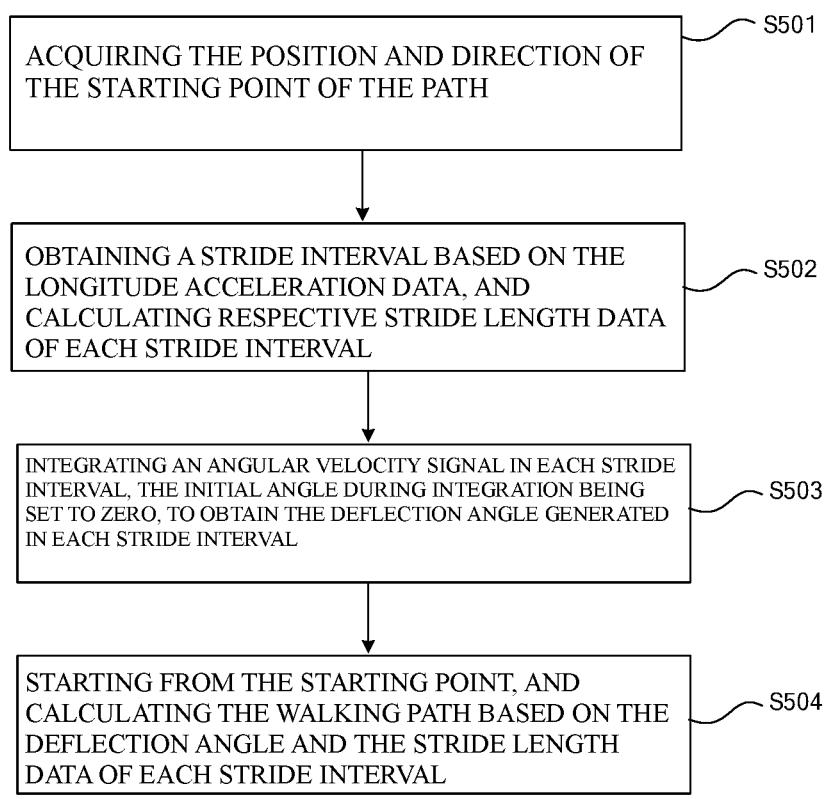
FIG. 4 is a flow chart of the method for detecting the pedestrian walking path according to Embodiment Three of the present invention.

As shown in FIG. 3, the present embodiment provides a method for detecting the pedestrian walking path, comprising:

Step S301: Acquiring the position and direction of the starting point of the path.

Step S302: Calculating a stride interval and stride length data for each stride.

Among them, the stride interval is the time taken by the user to cross one stride. The stride length data is the distance for the user to cross one stride. Calculating a stride interval and stride length data for each stride can be achieved by the existing detection technique for stride length.

Step S303: Integrating an angular velocity signal in each stride interval, the initial deflection angle during integration being set to zero, to obtain the deflection angle generated in each stride interval.

Among them, the longitudinal acceleration data describes the change of acceleration of the user in the direction of gravity in the walking process over time, and the time axis of the longitudinal acceleration data and the angular velocity signal are the same. The angular velocity signal is the horizontal rotation angular velocity derived from the angular velocity meter, which includes but is not limited to a gyroscope.

Step S304: Starting from the starting point; and calculating the walking path based on the deflection angle and the stride length data of each stride interval.

The solution of prior art integrates the angular velocity signal of the entire walking process continuously to obtain the total angular deflection from the starting point of the path. Since the angular velocity signal output by the gyro has drift, the existing calculation method can easily accumulate the drift error. In the present embodiment, each stride is integrated from zero. The calculated deflection angle is the angle that the user turns relatively before and after this stride, so that the error generated by the deflection angle in each stride can be controlled. Therefore, in the present embodiment, the section-by-section integration method is used to obtain the deflection angle of each stride, wherein the calculation for the deflection angle corresponding to each stride is independent and the error of the deflection angle is limited within the deflection error of one stride, so that accumulation of errors of deflection angle can be prevented and the walking path obtained on the basis of the present embodiment is more accurate. Furthermore, the method in the present embodiment is simple and highly-efficient, does not require expensive hardware devices, does not require the establishment of a new infrastructure (such as Bluetooth, WIFI, etc.), and all the mobile terminal that carry acceleration sensors and have been equipped with sufficient storage space and have a processor with certain computing capabilities can also be used to implement the method of this embodiment.

The preferred embodiment of Step S304 includes: starting from the starting point of the path, using the path direction the previous stride plus the deflection angle of current stride as a path direction of current stride, to draw a walking path along the path direction of current stride based on the stride length data within the stride interval. The initial path direction of the walking path is the direction of the path starting point acquired in step S301, and the initial coordinate of the walking path is the position of the starting point of the path obtained in step S301.

Another preferred embodiment of step S304 includes:

Step S401: starting from the starting point of the path and judging whether each stride is a straight line or a turn based on the deflection angle of each stride interval.

Step S402: drawing the walking path along the current walk direction based on the stride length data of current stride if the current stride is a straight line.

Step S403: using the direction of the current walk direction plus the deflection angle of current stride as a path direction of current stride to draw a walking path along the path direction of current stride based on the stride length data of current stride if the current stride is a turn.

If it is determined that the continuous N-stride (for example, 20 strides or 50 strides) is a straight-line walk, the walking direction should be considered as a straight line, and at the same time, the deflection angle during this N-stride period is accumulated to obtain a direction angle cumulative offset value of the angle velocity meter. Dividing the direction angle accumulative offset value by the time of the N strides can obtain the angular velocity zero drift value. In the process of integrating the angular velocity signal in each stride interval to calculate a deflection angle of one stride in step S303, the angular velocity zero drift value is firstly subtracted from the angular velocity signal, and then the integration is performed. This can eliminate the system zero drift of the angular velocity meter.

In above-mentioned preferred embodiment, the walk direction of a user is judged based on the deflection angle of each stride. For example, if a deflection angle of one stride is within 0.2 radian, the user can be considered as walking in a straight line, and if the deflection angle is more than 0.5 radian, the user can be considered as walking with a turn. In the case of turning in current experiments, the deflection angle usually reaches 0.7-0.8 or even more than 1 radian.

During walking, the user may experience slight deflections due to various reasons such as deflection due to avoiding obstacles, deflection caused by the user's walking gait, and deflection resulted from errors in the sensor system of the mobile terminal, but by synthesizing multiple strides, the walking path is a straight line. In this case, the above-mentioned slight deflection is reflected in the walking path so as to virtually increase the amount of calculation while making the drawn path not simple and beautiful. In addition, in the prior art, there is no way to obtain the deflection angle by which each stride is relatively rotated by means of continuous integration, so there is no way to correct the slight deflection. Therefore, the present preferred embodiment is advantageous in that, based on the method of calculating the deflection angle stride-by-stride, the correction is performed for the deflection angle of each stride so that the calculated walking path more conforms to the actual walking path.

The present embodiment further provides a preferred embodiment way for step S301. Specifically speaking, the location and direction of the starting point of the path may be obtained in advance through technical means such as GNSS, WIFI Bluetooth, electronic compass, and map matching.

This embodiment further provides a preferred embodiment way of step S301. Specifically speaking, the preferred implementation way of step S301 includes: the direction in which the user initially walks (i.e. the direction of the path starting point) may be inaccurate during the start and may be out of the way. After two or three strides, the previous data is corrected according to the subsequent data, and the direction of initial walking is re-set to improve the accuracy of subsequent path drawing.

The preferred implementation way of this embodiment further includes: in the process of drawing the path, if the determined map data can be obtained, the turning point on the map is matched according to the detected turning behavior, and the walking path is corrected according to the matched turning point, so that the accuracy can be improved.

Since the sensor output data inevitably has noise, the preferred method of the present embodiment includes performing noise reduction processing on the angular velocity signal before using the angular velocity data.

Another preferred method of the present embodiment further includes: obtaining a substantial direction (for example, the path direction before the loss of the signal is taken as the current path direction) when interference of some signals occurs in the process of walking in a straight line, for example when the signal output by the sensor is lost; estimating the walking path based on the substantial direction and the location before signal loss; acquiring the map data, which includes all the routes, matching a possible route in the map data based on the substantial direction and the location before the signal loss, and comparing the estimated walking path with the possible route; calculating a yaw angle based on the deviation such ten-meter-walking per one-degree deviation to calculate the error for the location, and correcting the user's walking path back to correct direction and length based on the yaw angle. The walking path thus obtained is more accurate.

The calculated walking path can be presented by an APP on the mobile terminal and combined with data such as maps to provide the user with a walking path.

Each of the preferred embodiments in the present embodiment can be arbitrarily combined.

Any methods provided in the present embodiment not only can be used for pedestrian and indoor navigation, but also can replace the hardware pedometer. The method can also be used for instant positioning, map construction, and available for commercial occasions such as indoor location signal fingerprint database collection.

The inertially-guided sensor (CEP or CER) is highly accurate over short distances, but the accuracy will diffuse over time. The short-range accuracy of GNSS is not high, but there will be no error diffusion for a long time. The method provided in the present embodiment can combine inertially-guided navigation and GNSS technology to complement one another, to improve the short-distance positioning and navigation accuracy while avoiding the long-term drift error, and the accuracy of the GNSS in the outdoor is improved while reducing the power consumption (low-frequency acquisition of GNSS etc.). The method provided in the present embodiment provides a high-precision, low-power general solution for indoor and outdoor positioning navigation.

Embodiment 3

The present embodiment provides a method for detecting the pedestrian walking path, comprising:

Step S501: Acquiring the position and direction of the starting point of the path.

Step S502: Obtaining a stride interval based on the longitude acceleration data; and calculating respective stride length data of each stride interval.

Among them, the longitudinal acceleration data comes from the acceleration sensor, and the longitudinal acceleration data describes the change of acceleration of the user in the direction of gravity in the walking process over time.

Among them, the stride length data is the distance that the user crosses in one stride.

Step S503: Integrating an angular velocity signal in each stride interval, the initial deflection angle during integration being set to zero, to obtain the deflection angle generated in each stride interval.

Among them, the longitudinal acceleration data describes the change of acceleration of the user in the direction of gravity in the walking process over time, and the time axis of the longitudinal acceleration data and the angular velocity signal are the same. The angular velocity signal is from the angular velocity meter, which includes but is not limited to a gyroscope.

Step S504: Starting from the starting point; and calculating the walking path based on the deflection angle and the stride length data of each stride interval.

The solution of prior art integrates the angular velocity signal of the entire walking process continuously to obtain the total angular deflection from the starting point of the path. Since the angular velocity signal output by the gyro has drift and noise, the existing calculation method can easily accumulate the drift and random error. In the present embodiment, each stride is integrated from zero. The calculated deflection angle is the angle that the user turns relatively before and after this stride, so that the error generated by the deflection angle in each stride can be controlled. Therefore, in the present embodiment, the section-by-section integration method is used to obtain the deflection angle of each stride, wherein the calculation for the deflection angle corresponding to each stride is independent and the error of the deflection angle is limited within the deflection error of one stride, so that accumulation of errors of deflection angle can be prevented and the walking path obtained on the basis of the present embodiment is more accurate. Furthermore, the method in the present embodiment is simple and highly-efficient, does not require expensive hardware devices, does not require the establishment of a new infrastructure (such as Bluetooth, WIFI, etc.), and all the mobile terminal that carry acceleration sensors and have been equipped with sufficient storage space and have a processor with certain computing capabilities can also be used to implement the method of this embodiment.

A preferred implementation method of step S502 includes:

Step S601: Detecting a peak value of longitudinal acceleration data.

Step S602: Integrating the longitudinal acceleration data between two adjacent peaks twice; and obtaining a longitudinal displacement amplitude value based on the integration result.

Among them, the time period between two adjacent peaks of the longitudinal acceleration is defined as a stride interval; the previous peak corresponds to the start point of one stride, and the successive peak corresponds to the end point of the stride. The longitudinal displacement amplitude value is the displacement of the user's center of mass in the direction of gravity during a one-stride process.

Step S603: Obtaining the stride length data based on the longitudinal displacement amplitude value, user's foot length and user's leg length.

Among them, the stride interval of the signal integration of the angular velocity in step S503 is strictly consistent with the stride interval of the integration of the longitudinal acceleration in step S602.

In above preferred embodiment, it is not necessary to detect the zero velocity position, but instead, directly the velocity is set to be zero at the position of the acceleration peak and the interval between two adjacent peaks of the longitudinal acceleration is set to be a stride interval. The stride interval determined by above method is more accurate. Thus, the operation of obtaining the longitude displacement amplitude value by integrating the acceleration data in the stride interval twice is more in line with the actual situation of the user's movement, and can make the finally-determined stride length data more accurate. Based on the accurate stride interval, the accuracy of the deflection angle for each can be further improved, and based on the accurate stride length data, the final path to be drawn is more accurate.

FIG. 2 illustrates a view of human walking model, showing a view of the geometrical relationship between the physical quantities during the human body's walking, wherein $h_1$ is the longitudinal displacement amplitude, l is the user's leg length, $S_2$ is the user's foot length. So $S_1 = 2\sqrt{2lh_1 - h_1^2}$ can be obtained through geometric relations and an entire stride length data $Len = S_1 + S_2$ can further be obtained.

Through step S601, the peak value of the longitudinal acceleration data is detected, and the interval between two adjacent peaks is a stride interval. For convenience of description, the time point corresponding to the previous peak is denoted by $t_1$, and the corresponding time point corresponding to the successive peak is recorded as $t_2$.

In this embodiment, the interval between two adjacent peaks of the longitudinal acceleration is set as a stride interval, and the longitudinal displacement amplitude value is obtained by integrating the acceleration data in the stride interval twice, wherein $S_1$ value of each stride is calculated independently. At the beginning of each stride, the longitudinal displacement amplitude value of the body mass center at the corresponding peak should be zero. After each stride interval is completed, the longitudinal displacement amplitude value of the body mass center should return to zero. So, this assumption can be used to eliminate the error. And the maximum value of the longitudinal displacement amplitude value in this integration interval is $h_1$, and then the $S_1$ value is further calculated.

Based on above method embodiment, the specific embodiment of step S602 includes:

Step S611: Integrating the longitudinal acceleration data between two adjacent peaks to obtain a velocity data. Assuming the longitudinal acceleration data is a, the velocity data as $v = \int a \cdot dt$, the starting point of the integration as $t_1$, and the ending point as $t_2$.

Step S612: Integrating the velocity data to obtain longitudinal displacement data $h = \int v dt$. The longitudinal displacement data h is a function of time.

Step S613: Taking a maximum value and a minimum value of the longitudinal displacement data h during the integration from $t_1$ to $t_2$ and subtracting the minimum value from the maximum value to obtain the longitudinal displacement amplitude value $h_1$. Among them, the minimum value may be a negative value.

Assuming that at the beginning of each stride the longitudinal displacement amplitude value of the body mass center at the corresponding peak should be zero, after each stride interval is completed, the longitudinal displacement amplitude value of the body mass center should return to zero. In the present embodiment, this assumption can be used to eliminate errors in the calculation process. Based on above assumption, another preferred implementation method of step S602 includes:

Step S621: Integrating the longitudinal acceleration data between two adjacent peaks to obtain a velocity data. Assuming that the longitudinal acceleration data is a, the velocity data as $v = \int a \cdot dt$, the starting point of the integration as $t_1$, and the ending point as $t_2$.

Step S622: Calculating a median velocity $$v_{median} = \frac{\sum v \Delta t}{\sum \Delta t}$$

based on the velocity data.

Step S623: Integrating a value left after subtracting the median velocity from the velocity data to obtain longitudinal displacement data $h = \int (v - v_{median}) dt$. By subtracting the median velocity from the velocity data, it is ensured that the entire longitudinal displacement amplitude value in a stride interval is zero.

Step S624: Taking a maximum value and a minimum value of the longitudinal displacement amplitude data during the integration from $t_1$ to $t_2$ and subtracting the minimum value from the maximum value to obtain the longitudinal displacement amplitude value $h_1$. Among them, the minimum value may be a negative value.

For the detection of stride length in this embodiment, any preferred implementation methods in Embodiment 1 may be combined to form a further preferred implementation method, which is not described herein again.

The preferred embodiment of Step S504 includes: starting from the starting point of the path, using the path direction the previous stride plus the deflection angle of current stride as a path direction of current stride, to draw a walking path along the path direction of current stride based on the stride length data within the stride interval. The initial path direction of the walking path is the direction of the path starting point acquired in step S501, and the initial coordinate of the walking path is the position of the starting point of the path obtained in step S501.

Another preferred embodiment of step S504 includes:

Step S701: Starting from the starting point of the path and judging whether each stride is a straight line or a turn based on the deflection angle of each stride interval.

Step S702: Drawing the walking path along the path direction of previous stride based on the stride length data of current stride if the current stride is a straight line.

Step S703: Using the path direction of previous stride plus the deflection angle of current stride as a path direction of current stride to draw a walking path along the path direction of current stride based on the stride length data of current stride if the current stride is a turn.

If it is determined that the continuous N-stride (for example, 20 strides or 50 strides) is a straight-line walk, the walking direction should be considered as a straight line, and at the same time, the deflection angle during this N-stride period is accumulated to obtain a direction angle cumulative offset value of the angle velocity meter. Dividing the direction angle accumulative offset value by the time of the N strides can obtain the angular velocity zero drift value. In the process of integrating the angular velocity signal in each stride interval to calculate a deflection angle of one stride in step S303, the angular velocity zero drift value is firstly subtracted from the angular velocity signal, and then the integration is performed. This can eliminate the system zero drift of the angular velocity meter.

In above-mentioned preferred embodiment, the walk direction of a user is judged based on the deflection angle of each stride. For example, if a deflection angle of one stride is within 0.2 radian, the user can be considered as walking in a straight line, and if the deflection angle is more than 0.5 radian, the user can be considered as walking with a turn. In the case of turning in current experiments, the deflection angle usually reaches 0.7-0.8 or even more than 1 radian.

During walking, the user may experience slight deflections due to various reasons such as deflection due to avoiding obstacles, deflection caused by the user's walking gait, and deflection resulted from errors in the sensor system of the mobile terminal, but by synthesizing multiple strides, the walking path is a straight line. In this case, the above-mentioned slight deflection is reflected in the walking path so as to virtually increase the amount of calculation while making the drawn path not simple and beautiful. In addition, in the prior art, there is no way to obtain the deflection angle by which each stride is relatively rotated by means of continuous integration, so there is no way to correct the slight deflection. Therefore, the present preferred embodiment is advantageous in that, based on the method of calculating the deflection angle stride-by-stride, the correction is performed for the deflection angle of each stride so that the calculated walking path more conforms to the actual walking path.

The present embodiment further provides a preferred embodiment way for stride S501. Specifically speaking, the location and direction of the starting point of the path may be obtained in advance through technical means such as GNSS, WIFI Bluetooth, electronic compass, and map matching.

This embodiment further provides a preferred embodiment way of step S501. Specifically speaking, the direction in which the user initially walks (that is, the direction of the path starting point) may be inaccurate during the start and may be out of the way. After two or three strides, the previous data is corrected according to the subsequent data, and the direction of initial walking is re-set to improve the accuracy of subsequent path drawing.

The preferred implementation way of this embodiment further includes: in the process of drawing the path, if the determined map data can be obtained, the turning point on the map is matched according to the detected turning behavior, and the walking path is corrected according to the matched turning point, so that the accuracy can be improved.

Since the sensor output data inevitably has noise, the preferred method of the present embodiment includes performing noise reduction processing on the angular velocity signal before using the angular velocity data.

Another preferred method of the present embodiment further includes: obtaining a substantial direction (for example, the path direction before the loss of the signal is taken as the current path direction) when interference of some signals occurs in the process of walking in a straight line, for example when the signal output by the sensor is lost; estimating the walking path based on the substantial direction and the location before signal loss; acquiring the map data, which includes all the routes, matching a possible route in the map data based on the substantial direction and the location before the signal loss, and comparing the estimated walking path with the possible route; calculating a yaw angle based on the deviation such ten-meter-walking per one-degree deviation to calculate the error for the location, and correcting the user's walking path back to correct direction and length based on the yaw angle. The walking path thus obtained is more accurate.

The calculated walking path can be presented by an APP on the mobile terminal and combined with data such as maps to provide the user with a walking path.

Each of the preferred embodiments in the present embodiment can be arbitrarily combined.

Any methods provided in the present embodiment not only can be used for indoor and outdoor positioning and navigation, but also can replace the hardware pedometer. The method can also be used for instant positioning and map construction, and available for commercial occasions such as indoor location signal fingerprint database collection.

The inertially-guided sensor (CEP or CER) is highly accurate over short distances, but the accuracy will diffuse over time. The short-range accuracy of GNSS is not high, but there will be no error diffusion for a long time. The method provided in the present embodiment can combine inertially-guided navigation and GNSS technology to complement one another, to improve the short-distance positioning and navigation accuracy while avoiding the long-term drift error, and the accuracy of the GNSS in the outdoor is improved while reducing the power consumption (low-frequency acquisition of GNSS signal etc.). The method provided in the present embodiment provides a high-precision, low-power general solution for indoor and outdoor positioning navigation.

Embodiment 4

The present embodiment provides a computer-readable medium on which computer-readable instructions are stored. When the computer runs the instructions, the method described in any of the above-mentioned embodiments is performed.

The present embodiment also provides an electronic device comprising a processor and a memory that stores an instruction executable by a processor, when the processor runs the instruction, the method described in any of the above-mentioned embodiments is performed. The electronic device can be carried by the user anywhere on the body.

At last, it should be illustrated that the above various embodiments are only used to illustrate the technical schemes of the present invention without limitation; and despite reference to the aforementioned embodiments to make a detailed description for the present invention, the ordinary technical personnel in this field should understand: the described technical scheme in above various embodiments can be modified or the part of or all technical features can be equivalently substituted; while these modifications or substitutions do not make the essence of their corresponding technical schemes deviate from the scope of the technical schemes of the embodiments of the present invention, all of which should be contained within the scope of the claims and description of the present invention.

What is claimed is:

1. A method for detecting stride length of a walking person, comprising:
   detecting with a processor peak values of acceleration data along the direction of gravity from an accelerometer, a time period between two adjacent peaks being a stride interval;
   integrating with a processor the acceleration data within the stride interval to obtain velocity data along the direction of gravity;

integrating with a processor the velocity data to obtain displacement amplitude data along the direction of gravity;

taking the maximum and minimum values of the displacement amplitude data;

subtracting the minimum value from the maximum value to obtain displacement amplitude value ($h_1$); and obtaining the person's stride length Len=$2\sqrt{2lh_1-h_1^2}+S_2$, wherein:

l is the length of the person's leg; and $S_2$ is the length of the person's foot.

2. The method in claim 1, further comprising:

calculating with a processor a median velocity based on the velocity data; and calculating with a processor a value left after subtracting the median velocity from the velocity data, wherein:

the integrand in the step of integrating with the processor the velocity data to obtain the displacement amplitude data is substituted by the value.

3. The method in claim 1, wherein, when the processor detects a peak value of acceleration data from the accelerometer:

the processor determines that what is being detected is a true peak signal only after:

a peak signal appears; and no new peak signal appears after the time of half a stride interval has passed; and the time of half a stride interval comes from historical statistics or default experience values.

4. The method in claim 1, wherein:

the obtaining the displacement amplitude value further includes using a range factor by a processor to adjust the displacement amplitude value; and the range factor is a default experience value or is obtained by comparing the displacement amplitude value estimated by a human walking model with a measured value.

5. The method in claim 4, wherein: during walking between two known points, the processor compares a measured distance between two known points obtained by adding the detected stride lengths with an actual distance between the two known points, then performs backward reasoning to obtain and update the range factor.

6. A method for detecting a path traveled by a walking person, comprising:

acquiring with a processor a position and direction of a starting point of the path;

detecting with a processor peak values of acceleration data along the direction of gravity from an accelerometer, the time period between two adjacent peaks being a stride interval;

integrating with a processor the acceleration data within the stride interval to obtain velocity data along the direction of gravity;

integrating with a processor the velocity data to obtain displacement amplitude data along the direction of gravity;

taking the maximum and minimum values of the displacement amplitude data;

subtracting the minimum value from the maximum value to obtain displacement amplitude value ($h_1$);

obtaining the person's stride length Len=$2\sqrt{2lh_1-h_1^2}+S_2$, wherein:

l is the length of the person's leg; and $S_2$ is the length of the person's foot;

integrating with a processor an angular velocity signal from an angular velocity meter in the stride interval, an initial deflection angle being set to zero during integration, to obtain a deflection angle generated in the stride interval; and starting by a processor from the starting point of the path and calculating the path based on the deflection angle and the stride length of each of the stride intervals making up of the path.

7. The method in claim 6, wherein starting by the processor from the starting point of the path and calculating the path based on the deflection angle and the stride length of each of the stride intervals making up of the path includes:

starting by the processor from the starting point of the path, using the direction of the starting point plus the deflection angle of current stride as a path direction of current stride, to draw a walking path along the path direction of current stride based on the stride length of current stride; and outputting from the processor the drawn walking path to a display device for displaying.

8. The method in claim 6, wherein starting by the processor from the starting point of the path and calculating the path based on the deflection angle and the stride length of each of the stride intervals making up of the path includes:

starting by the processor from the starting point of the path and judging whether each stride is a straight line or a turn based on the deflection angle of the stride interval;

drawing the path along the direction of the starting point based on the stride length of current stride if the current stride is a straight line; and using the direction of the starting point plus the deflection angle of current stride as a path direction of current stride to draw a path along the path direction of current stride based on the stride length of current stride if the current stride is a turn.

9. The method in claim 8, further comprising:

accumulating the deflection angles of N strides to obtain the direction angle cumulative offset value if the processor determines that N consecutive strides are all straight;

dividing the direction angle cumulative offset value by the time of this N strides to obtain the angular velocity zero drift value; and prior to the processor integrating an angular velocity signal from an angular velocity meter in the stride intervals, subtracting the angular velocity zero drift value from the angular velocity signal, and then integrating.

10. The method in claim 7, further comprising:

during drawing the path, acquiring with the processor a map data of a user's location; and matching the turning point in the map data based on the path if the processor detects that the user makes a turn and correcting the path based on the matched turning point.

11. The method in claim 7, further comprising:

obtaining with the processor a map data of the location of the person;

comparing the path with the route in the map data; and calculating a yaw angle if the path deviates from the route in the map data and correcting the path back to the correct direction and length based on the yaw angle.

12. The method in claim 6, wherein acquiring with the processor the location and direction of the starting point of the path includes one of:

acquiring with the processor the location and direction of the starting point through a position and an orientation sensor; or determining with the processor the location and direction of the starting point based on historically calculated data.

13. An electronic device, comprising a processor and a memory that stores instructions executable by the processor, wherein:

when the processor executes the instructions, the electronic device executes a method for detecting stride length of a walking person; and the method comprises:

detecting with a processor peak values of acceleration data along the direction of gravity from an accelerometer, a time period between two adjacent peaks being a stride interval;

integrating with a processor the acceleration data within the stride interval to obtain velocity data along the direction of gravity;

integrating with a processor the velocity data to obtain displacement amplitude data along the direction of gravity;

taking the maximum and minimum values of the displacement amplitude data;

subtracting the minimum value from the maximum value to obtain the displacement amplitude value ($h_1$); and obtaining the person's stride length Len=2$\sqrt{2lh_1 - h_1^2} + S_2$, wherein:

l is the length of the person's leg; and $S_2$ is the length of the person's foot.

14. The electronic device in claim 13, wherein the method further comprises:

calculating with the processor a median velocity based on the velocity data; and calculating with the processor a value left after subtracting the median velocity from the velocity data; and the integrand in the step of integrating with the processor the velocity data to obtain the displacement amplitude data is substituted by the value.

15. The electronic device in claim 13, wherein, when the processor detects a peak value of acceleration data from the accelerometer:

the processor determines that what is being detected is a true peak signal only after:

a peak signal appears; and no new peak signal appears after the time of half a stride interval has passed; and the time of half a stride interval comes from historical statistics or default experience values.

16. The electronic device in claim 13, wherein:

the obtaining the displacement amplitude value further includes using by the processor a range factor to adjust the displacement amplitude value; and the range factor is a default experience value or is obtained by comparing the displacement amplitude estimated by the human walking model with a measured value.

17. An electronic device, comprising a processor and a memory that stores instructions executable by the processor, wherein:

when the processor executes the instructions, the electronic device executes a method for detecting a path traveled by a walking person;

the method comprises:

acquiring with a processor a position and direction of a starting point of the path;

detecting with a processor peak values of acceleration data along the direction of gravity from an accelerometer, the time period between two adjacent peaks being a stride interval;

integrating with a processor the acceleration data within the stride interval to obtain velocity data along the direction of gravity;

integrating with a processor the velocity data to obtain displacement amplitude data along the direction of gravity;

taking the maximum and minimum values of the displacement amplitude data;

subtracting the minimum value from the maximum value to obtain displacement amplitude value ($h_1$);

obtaining the person's stride length Len=2$\sqrt{2lh_1 - h_1^2} + S_2$, wherein:

l is the length of the person's leg; and $S_2$ is the length of the person's foot;

integrating with a processor an angular velocity signal from an angular velocity meter in the stride interval, an initial deflection angle being set to zero during integration, to obtain a deflection angle generated in the stride interval; and starting by a processor from the starting point of the path and calculating the path based on the deflection angle and the stride length of each of the stride intervals making up of the path.

18. The electronic device in claim 17, wherein starting by the processor from the starting point of the path and calculating the path based on the deflection angle and the stride length of each of the stride intervals making up of the path includes:

starting by the processor from the starting point of the path, using the direction of the starting point plus the deflection angle of current stride as a path direction of current stride, to draw a path along the path direction of current stride based on the stride length of current stride; and outputting from the processor the drawn path to a display device for displaying.

19. The electronic device in claim 17, wherein starting by the processor from the starting point of the path and calculating the path based on the deflection angle and the stride length of each of the stride intervals making up of the path includes:

starting by the processor from the starting point of the path and judging whether each stride is a straight line or a turn based on the deflection angle of the stride interval;

drawing the path along the direction of the starting point based on the stride length of current stride if the current stride is a straight line; and using the direction of the starting point plus the deflection angle of current stride as a path direction of current stride to draw a path along the path direction of current stride based on the stride length of current stride if the current stride is a turn.

20. The electronic device in claim 19, further comprising:

accumulating the deflection angles of N strides to obtain the direction angle cumulative offset value if the processor determines that N consecutive strides are all straight;

dividing the direction angle cumulative offset value by the time of this N strides to obtain the angular velocity zero drift value; and prior to the processor integrating an angular velocity signal from an angular velocity meter in the stride intervals, further comprising subtracting the angular velocity zero drift value from the angular velocity signal, and then integrating.

\* \* \* \* \*